US009594664B2

(12) United States Patent
Driever et al.

(10) Patent No.: US 9,594,664 B2
(45) Date of Patent: *Mar. 14, 2017

(54) CORRELATING MULTIPLE DISJOINT EVENTS VIA AN OPERATION IDENTIFIER

(71) Applicant: International Business Machines Corporation, Armonk, NY (US)

(72) Inventors: Peter D. Driever, Poughkeepsie, NY (US); Richard K. Errickson, Poughkeepsie, NY (US); Andrew W. Piechowski, Lagrangeville, NY (US); Ambrose Verdibello, Millbrook, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/825,968

(22) Filed: Aug. 13, 2015

(65) Prior Publication Data

US 2016/0103725 A1 Apr. 14, 2016

Related U.S. Application Data

(63) Continuation of application No. 14/509,494, filed on Oct. 8, 2014.

(51) Int. Cl.
*G06F 11/00* (2006.01)
*G06F 11/34* (2006.01)
*G06F 11/07* (2006.01)

(52) U.S. Cl.
CPC ........ *G06F 11/3495* (2013.01); *G06F 11/079* (2013.01); *G06F 11/3466* (2013.01); *G06F 11/0709* (2013.01); *G06F 11/0751* (2013.01)

(58) Field of Classification Search
CPC ............. G06F 11/0709; G06F 11/0775; G06F 11/079; G06F 11/3006; G06F 11/3466; G06F 11/3476; G06F 11/3495; G06F 11/366; G06F 11/3696; G06F 2201/87
See application file for complete search history.

(56) References Cited

U.S. PATENT DOCUMENTS

| 7,194,664 | B1* | 3/2007 | Fung | G06F 11/3636 714/32 |
| 2003/0014380 | A1* | 1/2003 | Myers | G06F 11/3006 707/999.001 |
| 2004/0123293 | A1* | 6/2004 | Johnson | G06F 9/466 718/101 |

(Continued)

*Primary Examiner* — Gabriel Chu
(74) *Attorney, Agent, or Firm* — Cantor Colburn LLP; William A. Kinnaman, Jr.

(57) ABSTRACT

A system and method for correlating asynchronous operations via an operation identifier comprises receiving an originating operation from a first system that indicates a change in the first system and generating a first message with respect to the originating operation. The first message is associated with the operation identifier. The system and method further propagates the first message to a second system, which causes a subsequent operation being associated with the operation identifier to be performed by the second system, and correlates the originating operation and the subsequent operation via the operation identifier.

11 Claims, 5 Drawing Sheets

(56) References Cited

U.S. PATENT DOCUMENTS

| | | | |
|---|---|---|---|
| 2009/0049429 A1* | 2/2009 | Greifeneder | G06F 11/3495 717/128 |
| 2010/0223446 A1* | 9/2010 | Katariya | G06F 11/3495 712/220 |
| 2011/0099561 A1* | 4/2011 | Karakkattillathu Vishnu | G06F 11/3476 719/320 |
| 2011/0214020 A1* | 9/2011 | Caspi | G06F 11/0709 714/37 |
| 2012/0017120 A1* | 1/2012 | Kurapati | G06F 11/0709 714/39 |
| 2012/0084779 A1* | 4/2012 | Adler | G06F 11/3006 718/100 |
| 2013/0067067 A1* | 3/2013 | Miri | H04L 41/069 709/224 |

* cited by examiner

CORRELATING MULTIPLE DISJOINT EVENTS VIA AN OPERATION IDENTIFIER

DOMESTIC PRIORITY

This application is a continuation of U.S. application Ser. No. 14/509,494, filed on Oct. 8, 2014, the disclosure of which is incorporated by reference herein in its entirety.

BACKGROUND

The disclosure relates generally to operation identifiers, and more specifically, to correlating multiple disjoint events executing across a sysplex by use of operation identifiers.

In general, for a multi-system, interconnected environment or sysplex, there are often events and/or operations that cause separate but related synchronous and asynchronous events and/or operations. Today, there is no easy way to identify that these events and/or operations are directly linked together from a functional standpoint. For example, synchronous duplexed primary commands of the sysplex and their resulting secondary commands are generally not identified by their relationship, despite being directly linked. Similarly, secondary commands and secondary operations are also not identified by their relationship.

The inability to identify which events and/or operations are related and correlate those events and/or operations together prevents an identification of root causes of system problems in the sysplex, as well as validating operations of particular system functions, particularly when large numbers of systems are involved in the sysplex.

SUMMARY

According to one embodiment of the present invention, a method for correlating asynchronous operations via an operation identifier that comprises receiving an originating operation from a first system that indicates a change in the first system; generating, by a coupling facility, a first message with respect to the originating operation, the first message being associated with the operation identifier; propagating the first message to a second system, the propagating of the first message causing a subsequent operation to be performed by the second system, the subsequent operation being associated with the operation identifier; and correlating the originating operation and the subsequent operation via the operation identifier.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As indicated above, the inability to identify which events and/or operations are related and correlate those events and/or operations together prevents an identification of root causes of system problems in the sysplex. Thus, what is needed is an operation identifier mechanism for correlating multiple disjoint events and/or operations executing across a sysplex.

In general, the operation identifier mechanism is added to the sysplex and used for operations that are asynchronous and occurring on other systems of the sysplex. That is, because the asynchronous operations are related but not really connected to an originating operation, the operation identifier mechanism is carried along through the sysplex such that the full scope of the originating operation may be traced (e.g., the resulting generation of multiple other operation and/or events which were disjoint may be traced). As the operation identifier mechanism propagates through the sysplex, a value of the operation identifier mechanism may be modified to assist in indicating a type of the resulting operation and/or events.

For example, when a first system of a sysplex communicates information to a coupling facility, the coupling facility manages the information that all other systems of the sysplex work with the same information (e.g., the coupling facility employs controls that prevents multiple systems from accessing and updating the same information, such that there is consistency to that information). In this way, the coupling facility understands when a piece of information is in the first system and communicates that change to all other systems. Further, along with keeping the information consistent, the coupling facility has the responsibility of invalidating the information (locally) in the other systems that also have an interest in that information.

With respect to the operation identifier mechanism, when the coupling facility receives an originating operation from the first system that indicates a change in the system, the coupling facility associates an Operation Identifier ("OID") with that change. Next, based on the responsibility of invalidating, the coupling facility informs all other systems that they have obsolete information via resulting communication to those other systems, with each communication carries the OID for that change. Those communications in turn trigger subsequent operations and/or events, each of which is disjoint, internal to those systems. Yet, those further operations and/or events also include the OID. In this way, despite the originating change operation, resulting communications, and subsequent operations and/or events being asynchronous, the OID correlates these occurrences such that the full scope of the originating change operation may be traced.

Systems and/or computing devices, such as identification sysplex, may employ any of a number of computer operating systems, including, but by no means limited to, versions and/or varieties of the AIX UNIX and z/OS operating system distributed by International Business Machines Corporation of Armonk, N.Y., the Microsoft Windows operating system, the Unix operating system (e.g., the Solaris operating system distributed by Oracle Corporation of Redwood Shores, Calif.), the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, a computer workstation, a server, a desktop, a notebook, a laptop, a network device, or handheld computer, or some other computing system and/or device (e.g., personal digital assistant (PDA) or cellular telephone 54A, desktop computer 54B, laptop computer 54C, and automobile computer system 54N of FIG. 2).

In general, computing devices further may include a processor (e.g., processor 114 of FIG. 1) and a computer readable storage medium (e.g., memory 128 of FIG. 1), where the processor receives computer readable program instructions, e.g., from the computer readable storage medium, and executes these instructions, thereby performing one or more processes, including one or more of the processes described herein (e.g., identification process).

Computer readable program instructions may be compiled or interpreted from computer programs created using assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the computing device (e.g., a user's computer), partly on the computing device, as a stand-alone software package, partly on a local computing device and partly on a remote computer device or entirely on the remote computer device. In the latter scenario, the remote computer may be connected to the local computer through any type of network (as further described below), including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Computer readable program instructions described herein may also be downloaded to respective computing/processing devices from a computer readable storage medium or to an external computer or external storage device via a network (e.g., any combination of computing devices and connections that support communication). For example, a network may be the Internet, a local area network, a wide area network, a network of interconnected nodes, and/or a wireless network and comprise copper transmission cables, optical transmission fibers, wireless transmission, routers, firewalls, switches, gateway computers and/or edge servers, and utilize a plurality of communication technologies, such as radio technologies, cellular technologies, etc.

Computer readable storage mediums may be a tangible device that retains and stores instructions for use by an instruction execution device (e.g., a computing device as described above). A computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Thus, identification sysplex and method and/or elements thereof may be implemented as computer readable program instructions on one or more computing devices (e.g., computer workstation, server, desktop, etc.), stored on computer readable storage medium associated therewith. A computer program product may comprise such computer readable program instructions stored on computer readable storage medium for carrying and/or causing a processor to carry out the of identification sysplex and method.

The identification sysplex and method and/or elements thereof may also be implemented in a cloud computing architecture; however, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources, such as networks, network bandwidth, servers, processing, memory, storage, applications, virtual machines, and services that can be rapidly provisioned and released with minimal management effort or interaction with a provider of the service. This cloud model may include at least five characteristics (e.g., on-demand self-service, broad network access, resource pooling, rapid elasticity, and measured service), at least three service models (e.g., Software as a Service, Platform as a Service, and Infrastructure as a Service), and at least four deployment models (e.g., private cloud, community cloud, public cloud, and hybrid cloud).

On-demand self-service is an example of a cloud model characteristic where a cloud consumer can unilaterally provision computing capabilities, such as server time and network storage, as needed automatically without requiring human interaction with the service's provider. Broad network access is an example of a cloud model characteristic where capabilities are available over a network and accessed through standard mechanisms that promote use by heterogeneous thin or thick client platforms (e.g., computing systems as described above). Resource pooling is an example of a cloud model characteristic where the provider's computing resources are pooled to serve multiple consumers using a multi-tenant model, with different physical and virtual resources dynamically assigned and reassigned according to demand. Further, resource pooling provides a sense of location independence in that the consumer generally has no control or knowledge over the exact location of the provided resources but may be able to specify location at a higher level of abstraction (e.g., country, state, or datacenter). Rapid elasticity is an example of a cloud model characteristic where capabilities can be rapidly and elastically provisioned, in some cases automatically, to quickly scale out and rapidly released to quickly scale in. To the consumer, the rapid elasticity capabilities available for provisioning often appear to be unlimited and can be purchased in any quantity at any time. Measured service is an example of a cloud model characteristic where cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS) is an example of a service model where the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS) is an example of a service model where the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS) is an example of a service model where the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Private cloud is a cloud infrastructure that is operated solely for an organization. Private cloud may be managed by the organization or a third party and may exist on-premises or off-premises. Community cloud is a cloud infrastructure that is shared by several organizations and supports a specific community that has shared concerns (e.g., mission, security requirements, policy, and compliance considerations). Community cloud may be managed by the organizations or a third party and may exist on-premises or off-premises. Public cloud is a cloud infrastructure that is made available to the general public or a large industry group and is owned by an organization selling cloud services. Hybrid cloud is a cloud infrastructure that is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 1:
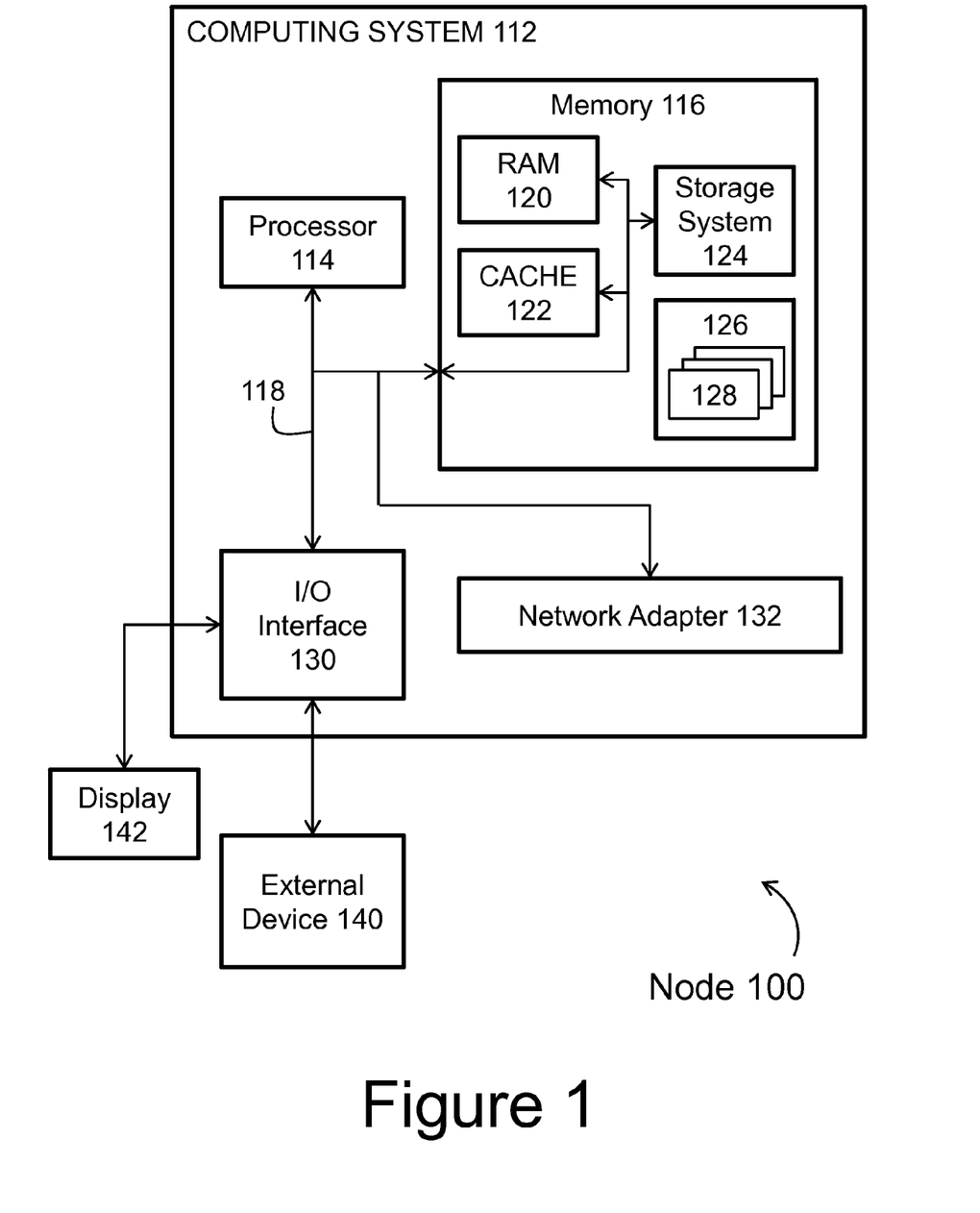
FIG. 1 illustrates a cloud computing node according to an embodiment of the present invention.

Referring now to FIG. 1, a schematic of an example of a cloud computing node is shown. Cloud computing node 100 is only one example of a suitable cloud computing node and is not intended to suggest any limitation as to the scope of use or operability of embodiments of the invention described herein. Regardless, cloud computing node 100 is capable of being implemented and/or performing any of the operability set forth hereinabove.

In cloud computing node 100 there is a computer system/server 122, which is operational with numerous other general purpose or special purpose computing system environments or configurations. Examples of well-known computing systems, environments, and/or configurations that may be suitable for use with computer system/server 112 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 112 may be described in the general context of computer system executable instructions, such as program modules, being executed by a computer system. Generally, program modules may include routines, programs, objects, components, logic, data structures, and so on that perform particular tasks or implement particular abstract data types. Computer system/server 112 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 112 in cloud computing node 100 is shown in the form of a general-purpose computing device. The components of computer system/server 112 may include, but are not limited to, one or more processors or processing units (e.g., processor 114), a system memory 116, and a bus 118 that couples various system components including memory 118 to processor 114.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 112 typically includes a variety of computer system readable media. Such media may be any available media that is accessible by computer system/server 112, and it includes both volatile and non-volatile media, removable and non-removable media.

The memory 116 can include computer system readable media in the form of volatile memory, such as random access memory (RAM) 120 and/or cache memory 122. Computer system/server 112 may further include other removable/non-removable, volatile/non-volatile computer system storage media. By way of example only, storage system 124 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 118 by one or more data media interfaces. As will be further depicted and described below, memory 116 may include at least one program product having a set (e.g., at least one) of program modules that are configured to carry out the operations of embodiments of the invention.

A program/utility 126, having a set (at least one) of program modules 128, may be stored in memory 116 by way of example, and not limitation, as well as an operating system, one or more application programs, other program modules, and program data. Each of the operating system, one or more application programs, other program modules, and program data or some combination thereof, may include an implementation of a networking environment. Program modules 128 generally carry out the operations and/or methodologies of embodiments of the invention as described herein.

Computer system/server 112 may also communicate via Input/Output (I/O) interfaces 130 and network adapters 132, such as with one or more external devices 140 such as a keyboard, a pointing device, a display 142, etc.; one or more devices that enable a user to interact with computer system/server 112; and/or any devices (e.g., network card, modem, etc.) that enable computer system/server 112 to communicate with one or more other computing devices. Such communication can occur. Still yet, computer system/server 112 can communicate with one or more networks such as a local area network (LAN), a general wide area network (WAN), and/or a public network (e.g., the Internet) via network adapter 132. As depicted, network adapter 132 communicates with the other components of computer system/server 112 via bus 118. It should be understood that although not shown, other hardware and/or software components could be used in conjunction with computer system/server 112. Examples, include, but are not limited to: microcode, device drivers, redundant processing units, external disk drive arrays, RAID systems, tape drives, and data archival storage systems, etc.

Figure 2:
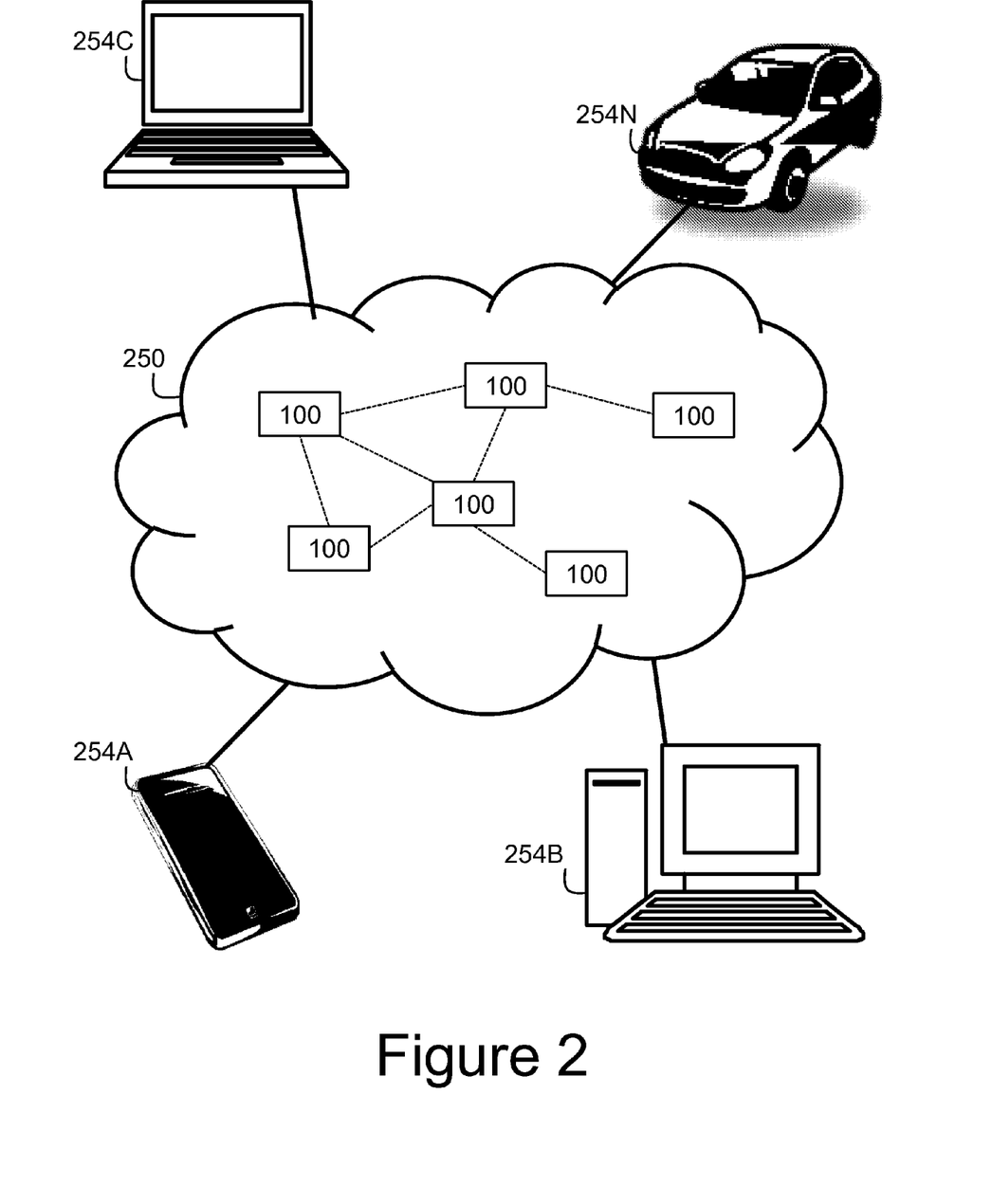
FIG. 2 illustrates a cloud computing environment according to an embodiment of the present invention.

Referring now to FIG. 2, illustrative cloud computing environment 250 is depicted. As shown, cloud computing environment 250 comprises one or more cloud computing nodes 100 with which local computing devices used by cloud consumers, such as, for example, personal digital assistant (PDA) or cellular telephone 254A, desktop computer 254B, laptop computer 254C, and/or automobile computer system 254N may communicate. Nodes 100 may communicate with one another. They may be grouped (not shown) physically or virtually, in one or more networks, such as private, community, public, or hybrid clouds as described hereinabove, or a combination thereof. This allows cloud computing environment 250 to offer IaaS, PaaS, and/or SaaS for which a cloud consumer does not need to maintain resources on a local computing device. It is understood that the types of computing devices 254A-N shown in FIG. 2 are intended to be illustrative only and that computing nodes 100 and cloud computing environment 250 can communicate with any type of computing system or computerized device over any type of network and/or network addressable connection (e.g., using a web browser).

Figure 3:
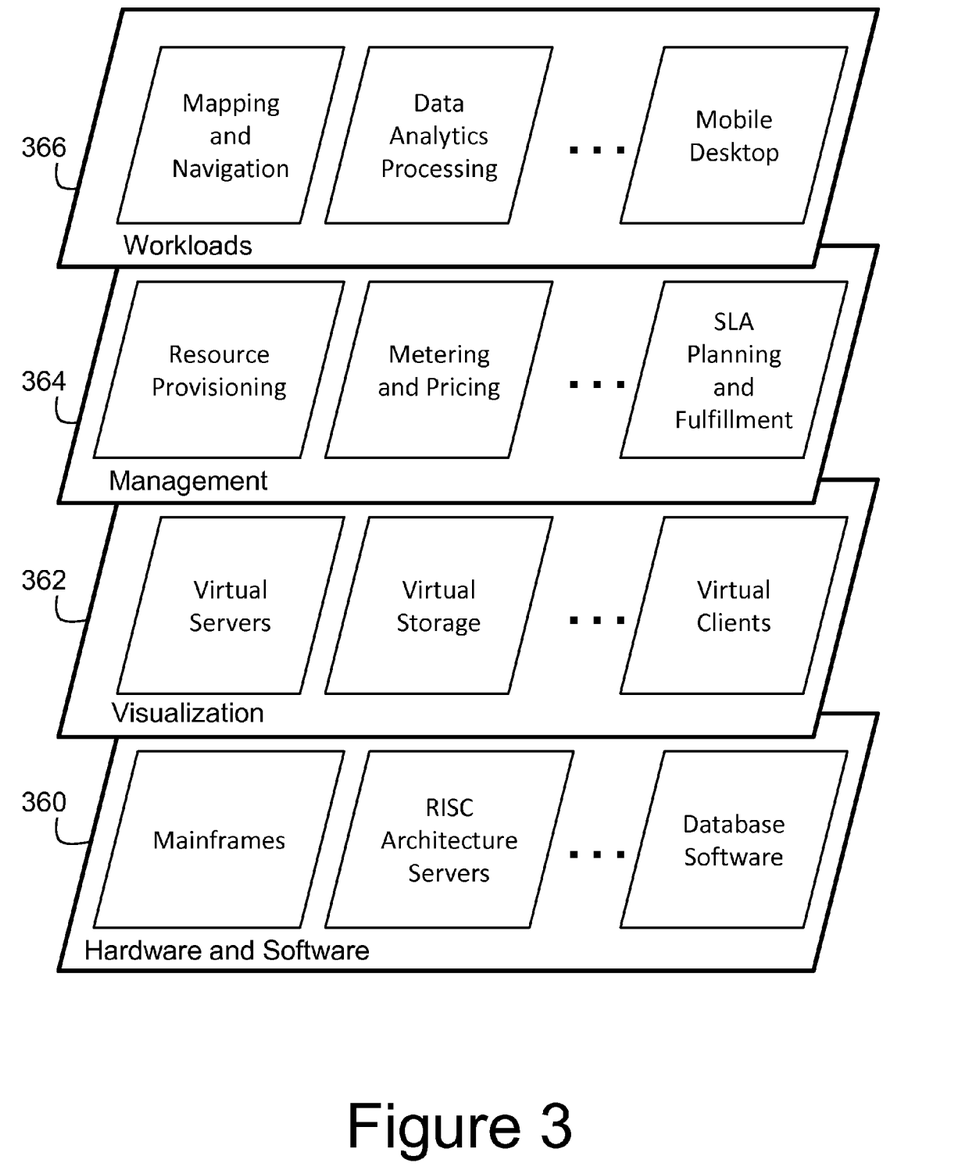
FIG. 3 illustrates abstraction model layers according to an embodiment of the present.

Referring now to FIG. 3, a set of operational abstraction layers provided by cloud computing environment 250 (FIG. 2) is shown. It should be understood in advance that the components, layers, and operations shown in FIG. 3 are intended to be illustrative only and embodiments of the invention are not limited thereto. FIG. 3 includes a hardware and software layer 360, a virtualization layer 362, a management layer 364, and workloads layer 366.

Hardware and software layer 360 includes hardware and software components. Examples of hardware components include mainframes, in one example IBM zSeries systems; RISC (Reduced Instruction Set Computer) architecture based servers, in one example IBM pSeries systems; IBM xSeries systems; IBM BladeCenter systems; storage devices; networks and networking components. Examples of software components include network application server software, in one example IBM WebSphere application server software; and database software, in one example IBM DB2 database software. (IBM, zSeries, pSeries, xSeries, BladeCenter, WebSphere, and DB2 are trademarks of International Business Machines Corporation registered in many jurisdictions worldwide).

Virtualization layer 362 provides an abstraction layer from which the following examples of virtual entities may be provided: virtual servers; virtual storage; virtual networks, including virtual private networks; virtual applications and operating systems; and virtual clients. In one example, management layer 364 may provide the operations described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 366 provides examples of operability for which the cloud computing environment may be utilized. Examples of workloads and operations which may be provided from this layer include: mapping and navigation; software development and lifecycle management; virtual classroom education delivery; data analytics processing; transaction processing; and identification processing.

Figure 4:
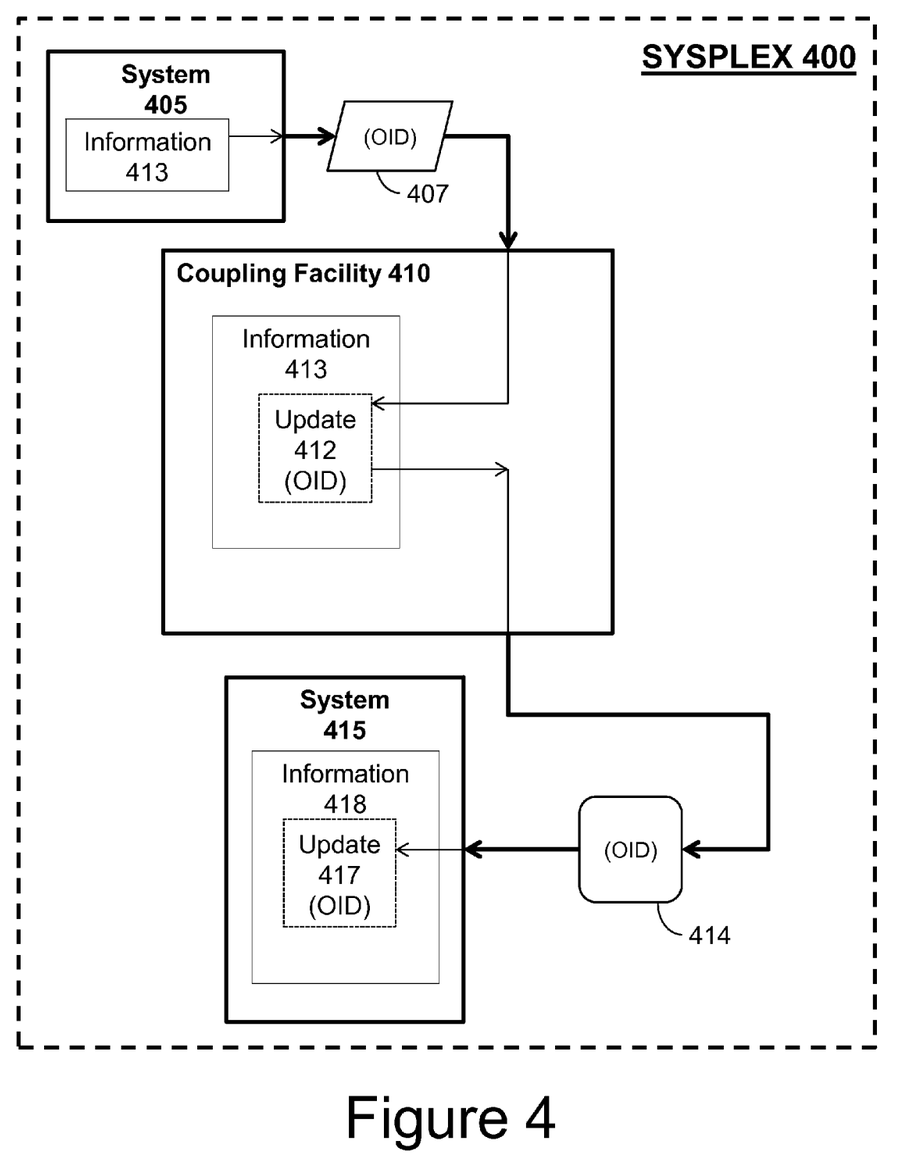
FIG. 4 illustrates an exemplary identification sysplex.

The identification sysplex will be described with reference to FIG. 4, which illustrates an example of a schematic of the identification sysplex 400. The identification sysplex includes a first system 405 (e.g., a z/OS System) that, in accordance with a change to local information 413, provides and assigns an OID at an origination of a Send Message ("SMSG") command 407 that informs a coupling facility 410 of the change. The OID is then passed with the SMSG command 407 across channels of the identification sysplex 400 to the coupling facility 410. Note that the SMSG command 407 is directed at the coupling facility 114, which is at the remote end of a coupling channel from the first system 413 issuing the SMSG command 407.

The coupling facility 410 is to provide added data (e.g., OID) to an SMSG, and the data may be used by the identification sysplex 400 for tracing. The OID may also be uniquely described operations and be carried through traces (e.g., SMSG(s), completion operations (e.g., Message Response Block (MRB) is response information provided on completion of that Send Message operation), secondary operations generated due to SMSG(s), and internal events generated due to SMSG(s)/secondary operations. Further, in accordance with the OID, the coupling facility may now utilize operands for the SMSG command/instruction and the MRB operations. Continuing with FIG. 4, the coupling facility 410 then updates 412 the information 413 that is being managed by the coupling facility 410 for the identification sysplex 400 in accordance with the SMSG command 407 (e.g., the originating message). That is, the coupling facility utilizes a Coupling Facility Control Code ("CFCC") to analyze the SMSG command 407. The coupling facility 410 next originates secondary commands 414 (e.g., signal channel buffer ("SCB") instructions) that include and pass along the OID to a second system 415 accordance with the now current information 413. For instance, the coupling facility 417 uses the SCB instruction to return the response as well as initiating other operations that involved sending information to other systems (e.g., system 415) connected via the coupling channels.

For instance, based on who the first system 405 is, where the originating SMSG command 407 came from, and what the originating SMSG command 407 instructs the coupling facility to do, the coupling facility 410 propagates information 413 to other systems (e.g., 415) via SCB instructions 414 that include the OID. The second system 415 in response to receiving the secondary command 414, as a result, updates 417 local information 418 and assigns the OID to those resulting operations.

Figure 5:
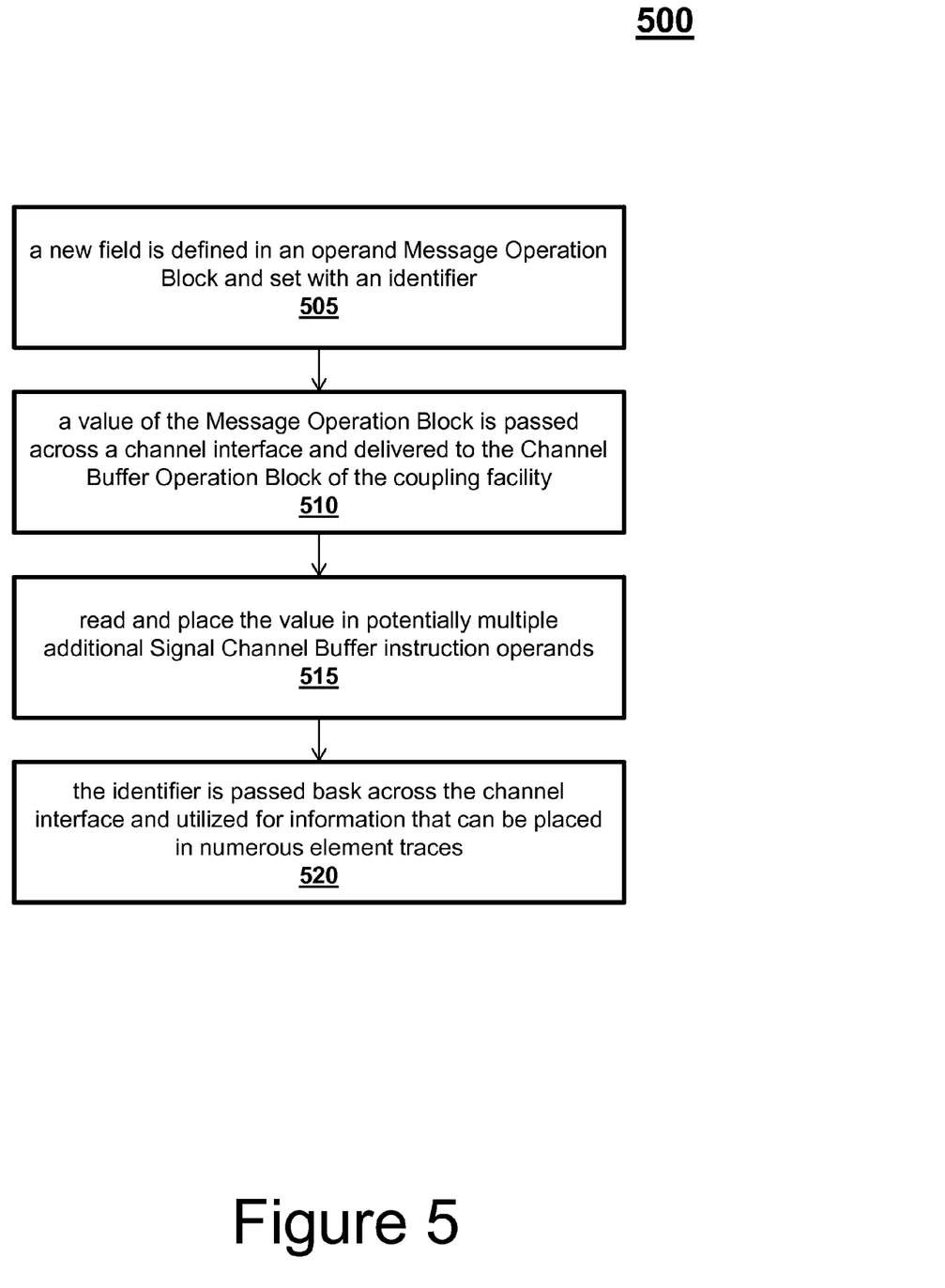
FIG. 5 illustrates an example of a process flow of identification sysplex.

The identification sysplex will be described with reference to FIG. 5, which illustrates an example of a process flow 500 of the identification sysplex 400.

The process flow 500 starts in block 505 where at the initiation of an operation at a first system 405 by the SMSG instruction 407, a new field is defined in an operand Message Operation Block ("MOB") and set with an identifier (e.g., OID) for the operation by the identification sysplex 400. At block 510, on execution of the SMSG instruction 407, a value of this field is passed across the channel interface and delivered to the Channel Buffer Operation Block ("CBOB") of the coupling facility 410 at the receiving side of the channel interface. Next, at block 515, the coupling facility 410 utilizes a CFCC to read and place the value in potentially multiple additional SCB instruction operands (e.g., SCB instructions 414).

Further, at block 520, the OID is passed bask across the channels to the first system 405 and is utilize for information that can be placed in numerous element traces. Examples of traces include z/OS traces, millicode level traces for coupling operations and events, i390/iop code traces for coupling related operations and events, and CFCC traces. For instance, the SCB is used to respond to the original SMSG operation where the value is passed back across the channel to complete the initiating SMSG operation at the first system and to initiate one or more secondary operations by the CFCC to either additional systems or other coupling facility systems. In both cases, the operation identifier value is passed across the channels allowing elements at both the originator end of the channel and the recipient end of the channel to have access to this value for use in saving within tracing information. By having this information available within these traces, operations that are directly related to one another but otherwise distinctly independent, asynchronous, and across many interconnected but otherwise independent systems can be readily identified as directly associated with each other by having the common operation identifier value within the trace.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the operations/acts specified in the flowchart and/or block diagram block or blocks. These computer readable program instructions may also be stored in a computer readable storage medium that can direct a computer, a programmable data processing apparatus, and/or other devices to operate in a particular manner, such that the computer readable storage medium having instructions stored therein comprises an article of manufacture including instructions which implement aspects of the operation/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the operations/acts specified in the flowchart and/or block diagram block or blocks.

The flowchart and block diagrams in the Figures illustrate the architecture, operability, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical operation(s). In some alternative implementations, the operations noted in the block may occur out of the order noted in the figures. For example, two blocks shown in succession may, in fact, be executed substantially concurrently, or the blocks may sometimes be executed in the reverse order, depending upon the operability involved. It will also be noted that each block of the block diagrams and/or flowchart illustration, and combinations of blocks in the block diagrams and/or flowchart illustration, can be implemented by special purpose hardware-based systems that perform the specified operations or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. For instance, by selection and use of the operation identifier mechanism, originating and/or primary operations and all secondary operations associated with the primary are traceable to enable the acquisition of the full scope of the originating and/or primary operations, such that each trace further sortable via operation identifier mechanism to access all information.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A sysplex for correlating disjoint events across the sysplex via an operation identifier, comprising:
   a coupling facility comprising a processor and a memory, the coupling facility configured to:
   receive a send message instruction indicating an initiation of an originating operation from a first system of the sysplex,
   wherein the originating operation indicates a change in the first system;
   associate the operation identifier with the change;
   propagate one or more messages to each system of the sysplex,
   wherein the one or more messages carry the operation identifier to each system, wherein the one or more messages trigger the disjoint events across the sysplex,
   wherein the operation identifier is applied by the sysplex to each of the disjoint events; and
   correlate the originating operation and the disjoint events via a value of the operation identifier.

2. The sysplex of claim 1, wherein the system is further configured to:
   initiate a trace of the operation identifier to discover a full scope of the originating operation.

3. The sysplex of claim 1, wherein the system is further configured to:
   inform a second system of the sysplex that local information of the second system is obsolete; and
   cause, as one of the disjoint events, an updating by the second system of the local information.

4. The sysplex of claim 1, wherein the coupling facility utilizes a coupling facility control code to analyze the originating operation.

5. The sysplex of claim 1, wherein the send message instruction is received by the coupling facility with the operation identifier included.

6. The system of claim 1, wherein the one or more messages comprise signal channel buffer instructions originated by the coupling facility that include and pass along the operation identifier to each system.

7. A computer program product, the computer program product comprising a non-transitory computer readable storage medium having program instructions for correlating disjoint events across the sysplex via an operation identifier embodied therewith, the program instructions executable by a processor to cause the processor to perform:
   receiving a send message instruction indicating an initiation of an originating operation from a first system of the sysplex,
   wherein the originating operation indicates a change in the first system;
   associate the operation identifier with the change;
   propagate one or more messages to each system of the sysplex, wherein the one or more messages carry the operation identifier to each system,
   wherein the one or more messages trigger the disjoint events across the sysplex,
   wherein the operation identifier is applied by the sysplex to each of the disjoint events; and
   correlating the originating operation and the disjoint events via a value of the operation identifier.

8. The computer program product of claim 7, wherein the program instructions are further executable by the processor to cause the processor to:
   initiate a trace of the operation identifier to discover a full scope of the originating operation.

9. The computer program product of claim 7, wherein the program instructions are further executable by the processor to cause the processor to:
   inform a second system of the sysplex that local information of the second system is obsolete; and
   cause, as one of the disjoint events, an updating by the second system of the local information.

10. The computer program product of claim 7, wherein the coupling facility utilizes a coupling facility control code to analyze the originating operation.

11. The computer program product of claim 7, wherein the send message instruction is received by the coupling facility with the operation identifier included.

* * * * *